United States Patent [19]

Billy

[11] Patent Number: 4,589,108

[45] Date of Patent: May 13, 1986

[54] MULTIPLEXER, DEMULTIPLEXER AND MULTIPLEXING-DEMULTIPLEXING EQUIPMENT WITH RECONFIGURABLE FRAMES

[76] Inventor: Jean C. Billy, Prat Cottee St Quay Perros, 22700 Perros Guirec, France

[21] Appl. No.: 607,118

[22] Filed: May 3, 1984

[30] Foreign Application Priority Data

May 4, 1983 [FR] France ................... 83 07438

[51] Int. Cl.$^4$ ............................................. H04J 3/16
[52] U.S. Cl. ..................................... 370/84; 370/112
[58] Field of Search ................ 370/79, 112, 84, 83, 370/95, 91

[56] References Cited

U.S. PATENT DOCUMENTS

| | | | |
|---|---|---|---|
| 3,959,595 | 5/1976 | Smith | 370/83 |
| 4,071,887 | 1/1978 | Daly et al. | 370/83 |
| 4,160,877 | 7/1979 | Vander Mey | 370/83 |
| 4,205,200 | 5/1980 | Parikh et al. | 370/83 |
| 4,319,352 | 3/1982 | Gupta et al. | 370/79 |
| 4,477,898 | 10/1984 | Cholat-Namy | 370/84 |
| 4,488,293 | 12/1984 | Haussmann et al. | 370/84 |
| 4,504,943 | 3/1985 | Nagano et al. | 370/79 |

FOREIGN PATENT DOCUMENTS 2222727  3/1973  France .
2504759  4/1981  France .

OTHER PUBLICATIONS

IBM Technical Disclosure Bulletin, vol. 20, No. 9, Feb. 1978; pp. 3547-3548, T. A. Hendrickson.
Review of the Electrical Communication Laboratories, vol. 31, No. 2, 1983, pp. 146–157, Tokyo (JP); T. Hanazawa et al.
Commutation & Transmission, vol. 4, No. 1, Mar. 1982, pp. 57–68, C. Saint-Suprey et al.
N. E. C. Research and Development, No. 63, Oct. 1981, pp. 1–9, Tokyo, Japan: S. Koizumi et al.
IBM Technical Disclosure Bulletin, vol. 23, No. 6, Nov. 1980; pp. 2325, 2326, New York, D. Sellier.

Primary Examiner—Robert L. Griffin
Assistant Examiner—Kenneth I. Rokoff
Attorney, Agent, or Firm—Oblon, Fisher, Spivak, McClelland & Maier

[57] ABSTRACT

The invention relates to a multiplexer, a demultiplexer and to multiplexing-demultiplexing equipment with configurable frames.

The reconfigurable frame multiplexer comprises a synchronous multiplexer, means for inserting a frame locking word, transmission management means, monitoring means and a microprocessor for controlling or communicating with the aforementioned means. A time base emits timing and synchronization signal for emitting a frame. This time base comprises a memory containing data, which codes the present frame configuration. During the reading of this memory by a fast time base, another memory is filled by the microprocessor in order to code a new frame configuration.

12 Claims, 9 Drawing Figures

MULTIPLEXER, DEMULTIPLEXER AND MULTIPLEXING-DEMULTIPLEXING EQUIPMENT WITH RECONFIGURABLE FRAMES

BACKGROUND OF THE INVENTION

The present invention relates to a multiplexer, a demultiplexer and to multiplexing-demultiplexing equipment with configurable frames.

The digitization of transmission networks requires the use of digital multiplexing-demultiplexing equipment ensuring the regrouping of a certain number of basic information channels in a single transmission channel with a higher flow rate. The diversity of multiplexing equipment continues to increase bearing in mind the large number of standardized basic flow rates or those which are in the process of being standardized (data, word coding, picture coding, etc.), the different standardized hierarchic levels with European and American standards and finally different types of existing multiplexing, such as synchronous multiplexing, multiplexing with positive justification or multiplexing with positive-negative justification.

The realisation of multiplexing equipment usually requires the definition and development of a certain number of specific high integration components which cannot generally be advantageously used in other equipment of the same technology. This leads to a large amount of research on components and consequently high purchasing and maintenance costs, particularly for equipment produced in small quantities.

Moreover, in view of the ever-increasing complexity of telecommunications networks, it becomes vital during the research carried out on multiplexing equipment to have elaborate operating functions, a constant monitoring of the transmission quality and a precise and effective location of defective parts in the multiplexing equipment. These operating functions are generally realised with the aid of microprocessor circuits. This only utilizes a very small part of the technical possibilities of microprocessor circuits and generally leads to high costs compared with the function performed.

Reference can be made to the work "Transport et traitement de l'information dans les réseaux et systémes téléinformatiques", DUNOD, 1979, C. C. MACCHI and J. F. GUILBERT and more particularly pp. 115 to 141 for a description of multiplexers and pp. 371 to 375 for a description of intelligent multiplexers called concentrators.

SUMMARY OF THE INVENTION

An object of the present invention is to provide universal multiplexing equipment with respect to the flow rate of the component channels and of the resulting channel. This is obtained by a parametrization of the frame structure, which is consequently adapted to the flow rates of these channels.

More specifically, the present invention relates to a reconfigurable frame multiplexer, incorporating a frame locking word, data blocks and a service block, said multiplexer incorporating:

a synchronous multiplexer receiving on N inputs a number N of low flow rate channels with random flow rates and supplies a multiplexed signal on an output channel, a frame locking word insertion means located downstream of the synchronous multiplexer, a time base supplying clock and synchronization signals to the synchronous multiplexer and to the a frame locking word insertion means, a monitoring means for monitoring the state of the low flow rate channels and the state of the reconfigurable frame multiplexer, transmission management means applying a signal to an input of said synchronous multiplexer, said signal occupying the service block in the frame, a microprocessor provided with a random access memory and a read-only memory connected to the monitoring means, to the frame locking word insertion means, to the time base and to the transmission management means, a user interface connected to the microprocessor, wherein the time base comprises a fast time base, Two means, each one being able to store a frame configuration with data sent by the microprocessor one of these storage means containing the present frame configuration, i.e. the one which is used at current time, said storage means being addressed in read-mode by the fast time base, the other storage means being addressed in write-mode by microprocessor for storing a new frame configuration a switch with two inputs and two outputs, the microprocessor being connected to one input of said switch, the fast time base to the other input of said switch, said switch also having a control input controlled processing means for processing the clock and synchronization signals said processing means receiving at its input the content of the storage means read by the fast time base.

The term present frame configuration is understood to mean the actual frame structure which is emitted. The sync signals emitted by the processing means can be used as an indication of justification bits, justification authorizations or the like. The reconfigurable frame multiplexer described consequently functions with both synchronous and plesiochronous channels.

The invention also relates to a reconfigurable frame demultiplexer receiving frame signals, said frame incorporating a frame locking word, data blocks and a service block, the demultiplexer comprising:

a synchronous demultiplexer receiving at its input the frame signals and supplying at its output N component signals and an auxiliary signal, frame locking word detection means, a time base supplying clock and synchronization signals to the synchronous demultiplexer and to the frame locking word detection means, transmission management means, receiving at its input the synchronous demultiplexer auxiliary signal, a microprocessor provided with a random access memory and a read-only memory connected to the means for investigating the frame locking word, to the time base and to the transmission management means, a user interface connected to the microprocessor, wherein the time base comprises:

a fast time base,

Two means, each one being able to store a frame configuration with data sent by the microprocessor one of these storage means containing the present frame configuration, i.e. the one which is used at current time, said storage means being addressed in read-mode by the fast time base, the other storage means being addressed in write-mode by microprocessor for storing a new frame configuration processing means for processing clock and synchronization signals said processing means receiving at its input the content of the storage means read by the fast time base.

The invention finally relates to a multiplexing-demultiplexing system with a reconfigurable frame having a multiplexer according to the above description, a demultiplexer according to the above description, the microprocessor and user interface being single and common to the multiplexer and demultiplexer.

According to a preferred embodiment, each storage means is a random access memory in each device according to the invention.

According to a secondary feature, the storage means are identical in each device according to the invention.

BRIEF DESCRIPTION OF THE DRAWINGS

The invention is described in greater detail hereinafter relative to non-limitative embodiments and then with reference to the attached drawings, wherein show.

DETAILED DESCRIPTION OF THE INVENTION

Figure 1:
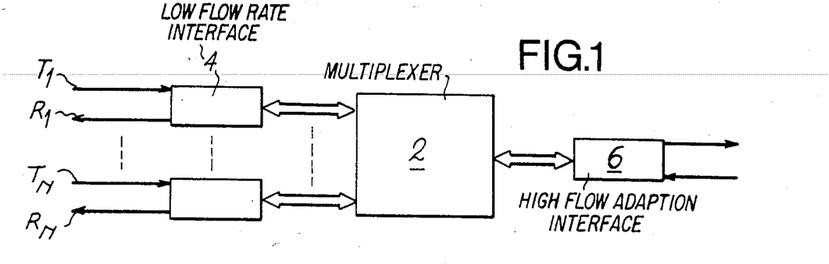
FIG. 1 diagrammatically, the known structure of multiplexing equipment.

Multiplexing equipment can be functionally broken down into three parts, as shown in FIG. 1. Such an equipment comprises a multiplexer 2 connected to the low flow rate transmission channels by low flow rate adaptation interfaces 4 and connected to the high flow rate transmission channel by a high flow adaptation interface 6. Low flow rate interface 4 is specific to the type of cable and the code used.

In order to adapt the signal received from a low flow rate channel to multiplexer 2, interface 4 has in conventional manner a transmission part and a reception part. In the case of synchronous multiplexing, the transmission part comprises detection means for detecting the frame locking word in signal $T_1$ and a buffer store for storing the data extracted from said frame. Said data are then read by a multiplexer 2 with the aid of a clock or timing signal emitted by the multiplexer. In a symmetrical manner, the reception part of interface 4 comprises a buffer store for receiving the data from the multiplexer and means for supplying in the form of frame $R_1$ the data collected in said buffer store.

In the case of multiplexing plesiochronous signals, interface 4 has, on transmission, a device for synchronization by the so-called positive or positive-negative justification method, whilst in reception it has a desynchronization device.

The connections between multiplexer 2 and each interface 4 more particularly comprise a data channel for transmitting the data from interface 4 to multiplexer 2, the flow rate of said data being timed by a timing signal transmitted from multiplexer 2 to interface 4, a data channel for transmitting the data from multiplexer 2 to interface 4, the flow rate of said data being timed by another timing signal transmitted from multiplexer 2 to interface 4. Other connections for carrying sync signals, alarms or the like also exist. In known multiplexing equipment, multiplexers 2 receive on the low flow rate channels or on the high flow rate channel, signals whose flow rate is fixed by construction. As a function of the particular channels, these signals can have different flow rates.

The multiplexer according to the invention provides greater flexibility to the multiplexing equipment. Thus, in a multiplexer according t the invention, the flow rate of the low flow rate channels and the high flow rate channel are not fixed by construction, but are instead parametrable. This parametrization can be performed automatically with each of the channels carrying a clock signal at the same time as its data signal. This parametrization can also be directly performed by the user.

Figure 2:
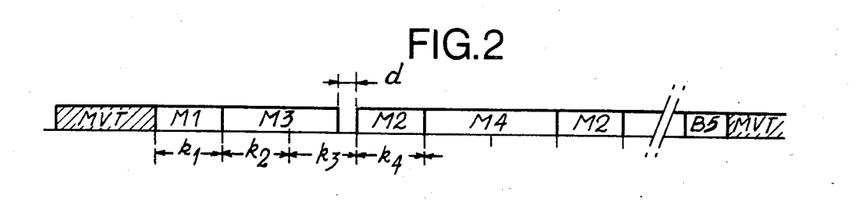
FIG. 2 a frame structure realised with the multiplexer according to the invention.

FIG. 2 shows a frame structure obtained with a multiplexer according to the invention. In conventional manner, this frame is constituted by a frame locking word, followed by data blocks and a service block. In the present case, there is a signal service block BS, which is placed at the end of the frame. The low rate and position of this service block are chosen by the user. This service block carries information for managing the transmission of the frame, as well as operation, alarm and monitoring information to remote equipment. The said information are, for example, of the HDLC (High Level Data Link Control) type. Apart from the high performance error detection system incorporated into this procedure, the choice of a HDLC procedure makes it possible in part to use the reconfigurable frame multiplexer-demultiplexer in statistical HDLC frame multiplexing application. The service block becomes an HDLC data block from the statistical multiplexing of HDLC data of low flow rate channels. An example is the digitization of the local network at the flow rate of 144 kbit/s.

The area reserved for the data is subdivided into blocks $K_1, K_2 \ldots K_N$ of identical length. The lengths of these data blocks is defined by the user and can e.g. be between 1 and 10 bits. These data blocks can be filled by data packets $M_1, M_2, M_3$, etc. coming from the low flow rate channels having random flow rates. The length of these packets can also be programmed by the user. This length is of a random nature, but it is clear that the filling level in the frame is maximum if the length of each packet is a multiple of the length of the data blocks. If this is not the case and this can more particularly be due to the particular flow rate of a low flow rate channel, there appears a loss such as d in the frame.

The allocation of data blocks to the data packets can take place dynamically or statistically in accordance with the programming of the multiplexer. When a low flow rate channel does not transmit data, it is possible to insert into the frame a data packet corresponding to said channel and constituted by filling data. It can also be decided not to insert packets relating to this channel. The latter case is of interest, because it makes it possible to optimize the resulting flow rate by only transmitting data from active channels. This operating mode is called "concentrator mode". Thus, the structure of the same is more particularly affected by the insertion or extraction of a low flow rate channel. This frame is obtained by a reconfigurable frame multiplexer according to the invention and described relative to FIG. 3.

Figure 3:
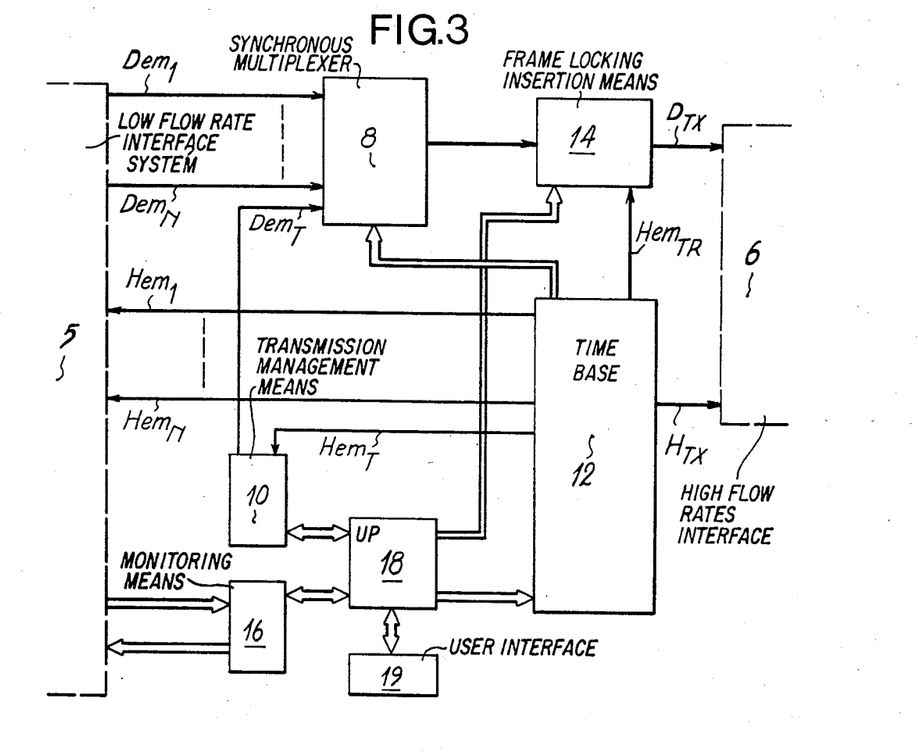
FIG. 3 a diagrammatic drawing of an embodiment of a multiplexer according to the invention.

The reconfigurable frame multiplexer shown in FIG. 3 comprises a synchronous multiplexer 8 receiving on N inputs data signals $Dem_1 \ldots Dem_N$ coming from N low flow rate channels from the interface 5 symbolizing the low flow rate interface system. The synchronous multiplexer 8 also receives on another input a signal $Dem_T$ supplied by transmission management means 10. The transmission management information qualifies the frame structure adopted, i.e. the numbers and flow rates of the component (i.e. low flow rate) channels, whose data use blocks $K_i$, in which $1 \leq i \leq N$. The data flow reaching the inputs of multiplexer 8 is controlled by clock signal $Hem_1 \ldots Hem_N$, $Hem_T$, which are produced by a time base 12 and applied to interface 5. Data $Dem_1 \ldots Dem_N$ are broken down by timing signals $Hem_1 \ldots Hem_N$ into packets, which will occupy the data blocks of the frame. Signals $Dem_T$ will be validated in the service block of the frame by timing signal $Hem_T$.

The time base 12 also supplies signals to the control inputs of multiplexer 8 in order to switch one of the input channels to the output of said multiplexer, which determines the order in which the data packets appear in the frame. The time base 12 then emits a timing signal $Hem_{TR}$ to a means 14 for inserting a frame locking word, which, in the drawing, is positioned downstream of synchronous multiplexer 8 and a signal $H_{TX}$, namely a timing signal whose frequency is equal to the flow rate of the signal $D_{TX}$ of the multiplexed data supplied to the high flow rate interface 6. The structure of the frame locking word (binary content and length) is defined by programming a few parameters so as to easily adapt to any random standardized or non-standardized frame structure. It is well known to the Expert that the insertion of the frame locking word can also be realised prior to the multiplexing of the data and a fraction of the frame locking word can then be inserted into each low flow rate channel. In general terms, it does not fall outside the scope of the invention to use any known frame locking word insertion means.

The reconfigurable frame multiplexer also comprises a monitoring means 16 for monitoring the state of the low flow rate channels and the state of the reconfigurable frame multiplexer. This monitoring means 16 supplies to the low flow channels monitoring signals thereof in order to monitor the synchronization word losses, missing signals and the measurement of the justification ratio. From the low rate interfaces, it receives signals such as the presence of each channel, the presence of a signal on each channel, the measurement of the flow rate of the signal of each channel, the reading of alarms, etc. It also controls the reconfigurable frame multiplexer by the measurement of timing frequencies $Hem_1 \ldots Hem_N$, the measurement of the frequencies of sync signals, by an auto-monitoring programme of the microprocessor, by a "watch dog" by a remote-local monitoring programme (with HDLC frame), etc. The signal presence signal is more particularly used in the concentrator mode for determining the presence in the frame of the corresponding low flow rate channel. The reconfigurable frame multiplexer system is controlled by a microprocessor 18 controlling the transmission management means 10, the time base 12, the frame locking word insertion means 14 and communicating with the monitoring means 16 and a user interface 19.

The frame is configured by the time base 12. In particular, timing signals $Hem_1 \ldots Hem_N$, $Hem_T$ and $Hem_{TR}$ respectively validate signals $Dem_1 \ldots Dem_N$, $Dem_T$ and the frame locking word. The aforementioned timing signals also determine the length of the data packets or words, from which the frame is composed. The order in which these words are present in the frame is determined by control signals applied by the time base 12 to a control input of the synchronous multiplexer 8. When it is wished to modify the frame, e.g. in the concentrator mode in the case of a disconnection of the user of a low flow rate channel, it is merely necessary to modify certain timing and control signals from time base 12. The structure of time base 12 diagrammatically shown in FIG. 4 permits an easy understanding of how the frame can be modified.

Figure 4:
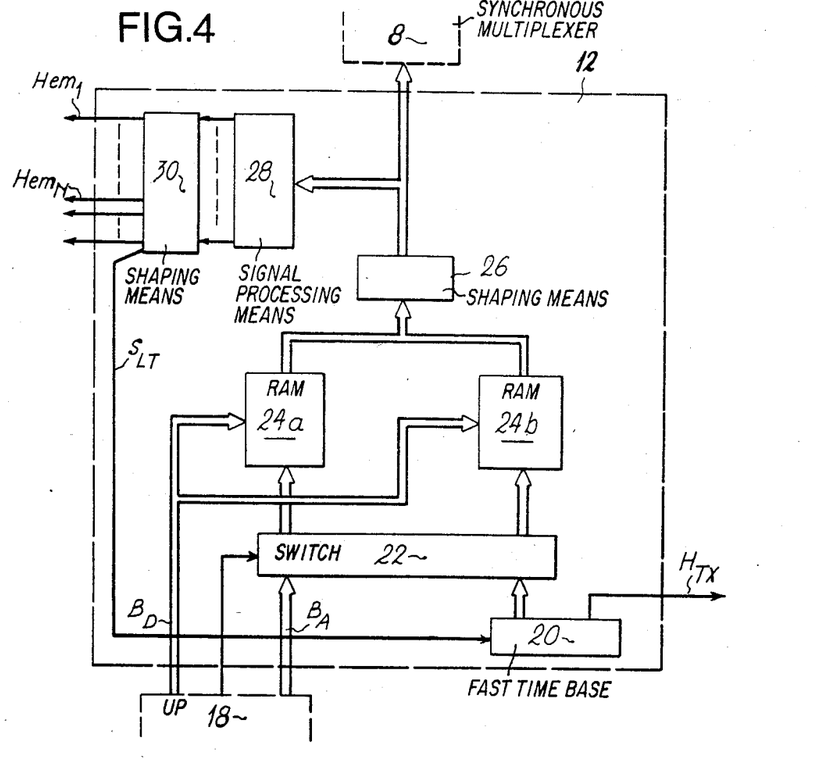
FIG. 4 a detailed diagrammatic drawing of the time base according to the invention used in the multiplexer of FIG. 3.

Time base 12 comprises a fast time base 20, which supplies timing signal $H_{TX}$, whose frequency corresponds to the flow rate of the multiplexed signal. This fast time base 20 is also connected to one of the inputs of a switch 22 having two inputs and two outputs. The address bus $B_A$ of microprocessor 18 is connected to the other input of switch 22. Each of the outputs of switch 22 is connected to a storage means of the random access memory type 24a and 24b by connections making it possible to address said memories. Moreover, the data bus $B_D$ of microprocessor 18 is connected to each of the random access memories 24a and 24b.

The frame configurations are coded in these two random access memories. One of the memories, e.g. 24a, contains the present frame configuration, i.e. used at the current time, whilst the other 24b contains a future frame configuration. Switch 22 is positioned in such a way that the fast time base 20 reads the memory containing the present frame configuration in order to produce timing signals making it possible to process said frame. During this time, microprocessor 18 connected to the other random access memory may write into the latter data corresponding to a new frame configuration.

The data read by time base 20 in the memory containing the present configuration are shaped by means 26 which supply signals to the synchronous multiplexer 8 on the one hand and to means 28 for processing the timing signals on the other. The signals supplied to synchronous multiplexer 8 are control signals making it possible to connect an input channel of synchronous multiplexer 8 to its output channel. The structure of the timing signal processing means 28 is obviously dependent on the way in which the frame configuration is stored in the random access memory. For example, a description will be given of a processing means 28 comprising a decoder linked with a special form of the coding of the frame configuration in the random access memories.

Each of these memories contains at least $L_T$ words of p bits each, in which $L_T$ is the maximum frame length and p is such that $2^p$ is equal to or greater than the number N of low flow rate channels. Each of the words of the RAM corresponding to the present configuration will be successively read by the fast time base. Each of these words is applied to the input of the processing means 28 and produces a pulse on one of the timing signals corresponding to one of the bits of the frame.

For example, if the frame has a frame locking word of length l bits, the l first words of the RAM read by the fast time base 20 and applied to the inputs of processing means 28 lead at the output of means 28 and after shaping by means 30 to a timing signal Hem$_{TR}$ having l successive pulses, which validate the l bits of the frame locking word. Processing means 28 thus comprises at the input a decoder with p inputs and N outputs. Following said decoder, it can comprise other means for realising sync signals from process signals. Among, these, the frame sync signal S$_{LT}$ is applied to one input of the fast time base 20. This signal is dependent on the length of the frame chosen by the user.

Whilst the fast time base 20 reads one of the random access memories to produce the timing signals making it possible to transmit a frame, the microprocessor 18, if it is necessary to modify the frame configuration, will load into the other RAM a new frame configuration by means of its data bus B$_D$. This configuration could differ from the present configuration by the position in the frame of data words corresponding to each flow rate channel, possibly the length of frame L$_T$, the length of the data blocks K$_1$ . . . K$_N$, etc.

This multiplexing-demultiplexing equipment can produce any random fixed structure frame (standard frames) or a reconfigurable frame in the multiplexer or concentrator operating modes, or both of these at once, whereby certain of the low flow rate channels can be temporarily multiplexed and others concentrated, as required by the user.

Figure 5:
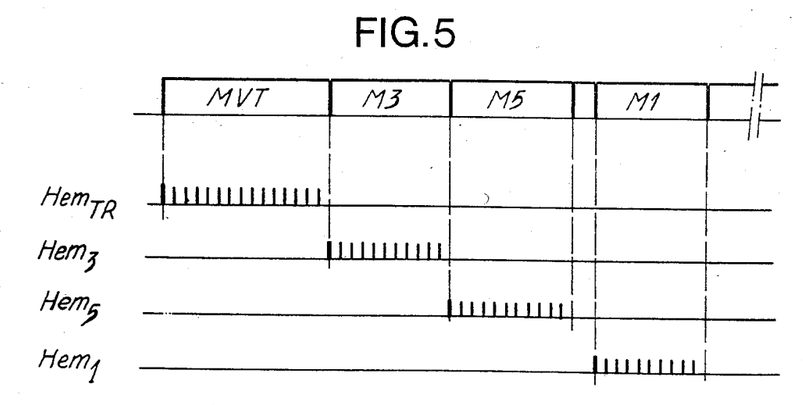
FIG. 5 a chronogram showing the clock signals produced by the time base to constitute the frame.

FIG. 5 shows an example of a certain number of timing signals produced by the time base 12 of FIG. 4. The frame is symbolized by a succession of blocks containing a frame locking word MVT, a word M$_3$ corresponding to the data from the low flow rate channel 3, a word M$_5$ and a word M$_1$. During the time base when timing signal Hem$_{TR}$ supplies pulses, the frame locking word is emitted on the multiplexed line synchronously with these pulses. In the same way, word M$_3$ is emitted synchronously with the pulses of timing signal Hem$_3$. The other words M$_5$ and M$_1$ are emitted in the same way.

Figure 6:
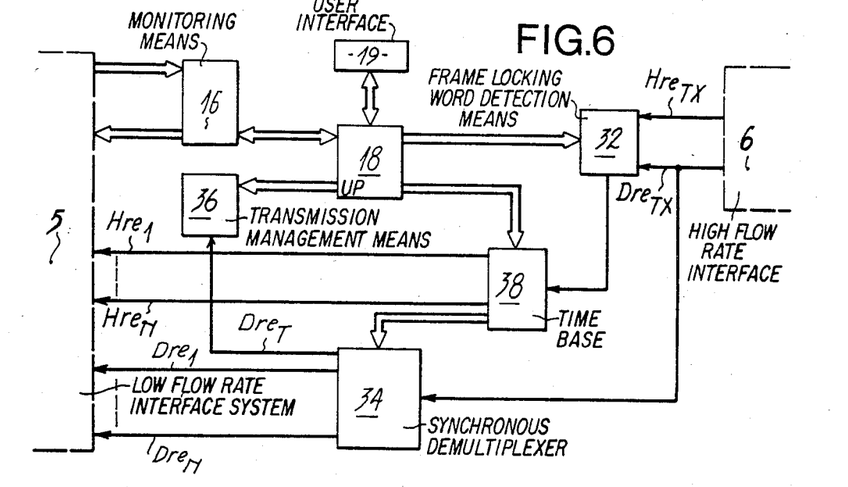
FIG. 6 a diagrammatic view of a demultiplexer according to the invention.

A description of a reconfigurable frame multiplexer according to the invention has been given with reference to FIGS. 3 and 4. It is obvious that the time base described relative to FIG. 4 used in the multiplexer and permitting the reconfiguration of the frame can also be used in a reconfigurable frame demultiplexer. FIG. 6 shows a diagram of such a demultiplexer, the structure thereof being identical to that of the multiplexer described hereinbefore.

This demultiplexer comprises a microprocessor 18 communicating with a monitoring means 16 and a user interface 19. This microprocessor 18 is also connected to detection means 32 for detecting and recognising a frame locking word, to a time base and to a transmission management means 36. The reconfigurable frame demultiplexer finally comprises a synchronous demultiplexer 34, which receives at its input a multiplexed signal Dre$_{TX}$ and supplies component signals extracted from said frame Dre$_1$ . . . Dre$_N$ and Dre$_T$. The N first signals referred to hereinbefore are collected by interface 5. Each of these signals corresponds to a low flow rate channel. The last aforementioned signal Dre$_T$ is applied to the input of the transmission management means 36. The switching of the multiplexed signal Dre$_{TX}$ present at the input of synchronous demultiplexer 34 to one of the aforementioned outputs takes place by the control inputs controlled by time base 38. This time base 38 also supplies clock signals Hre$_1$ . . . Hre$_N$, whose frequencies are respectively equal to the flow rate of the signals Dre$_1$ . . . Dre$_N$. These timing signals are also applied to the input of the low flow rate interface 5. Time base 38 also emits a signal Hre$_T$ applied to the input of the transmission management means 36 and whose frequency is equal to the flow rate of signal Dre$_T$. The synchronization of time base 38 is realised by a signal from the detection means 32 for detecting and recognising the frame locking word. Monitoring means 16 exchanging information with the low flow rate interface 5 on the one hand and with microprocesor 18 on the other, is identical to that described in the reconfigurable frame multiplexer of FIG. 3.

As in the reconfigurable frame multiplexer, microprocessor 18 more particularly has the function of coding in a random access memory contained in the time base a new frame configuration, the present frame configuration being coded in another RAM of the same time base 38 and being read by a fast time base.

Figure 7:
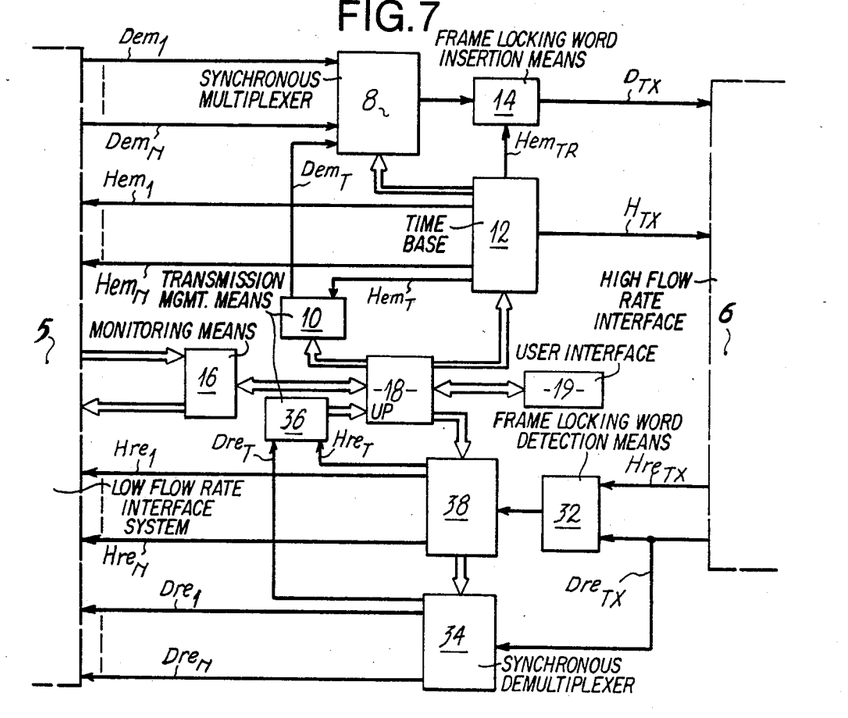
FIG. 7 a diagrammatic view of a multiplexing-demultiplexing system according to the invention.

FIG. 7 shows a reconfigurable frame multiplexing-demultiplexing system, which can be operationally subdivided into two parts, namely a reconfigurable frame multiplexer identical to that shown in FIG. 3 and a reconfigurable frame demultiplexer identical to that of FIG. 6. Some of the circuits, such as microprocessor 18, user interface 20 and monitoring means 16 are common to both parts. These points will not be described again and reference with respect thereto can be made to FIGS. 3 and 6, each of the time bases 12 and 38, controlling the synchronous multiplexer 8 on the one hand and on the other synchronous demultiplexer 34 having an identical structure to the time base shown in FIG. 4.

Figure 8:
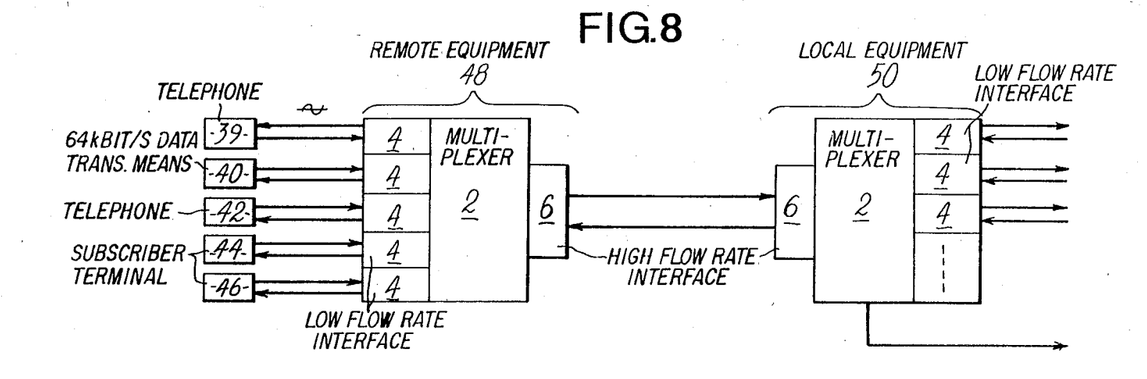
FIG. 8 an example of an application of a multiplexer according to the invention used in the field of local network digitization.

FIG. 8 shows an example of the use of two reconfigurable frame multiplexing-demultiplexing systems in connection with the digitization of the local network. The component channels have standardized flow rates. For example, a channel transmitting data to means 40 has a flow rate of 64 kbit/s, a channel connected to a telephone 42 and carrying a coded analog signal and a message has a flow rate of 72 kbit/s, channels connected to subscriber terminals 44 and 46 have flow rates of 80 or 144 kbit/s. There can also be analog means such as a telephone 39, whose information is directly coded in the remote equipment 48. The resultant flow rate of the signal transmitted by the remote equipment 48 can be 704, 1544, 2048 kbit/s or higher, as a function of the connected component channels. The local equipment 50 manages the frame structure, the operating functions relative to the system formed by the high flow rate link, the remote multiplexer-demultiplexer and the remote subscribed controls and connections. The local equipment 50 transmits to remote equipment 48 by means of service data blocks inserted in the all flow rate frame, the characteristics of the adopted frame structure and optionally operational information. By means of said same service data blocks, the remote equipment 48 informs in the other direction the local equipment 50 of the characteristics of the connected low flow rate channels (flow rate, alarm, signal presence, etc).

Figure 9:
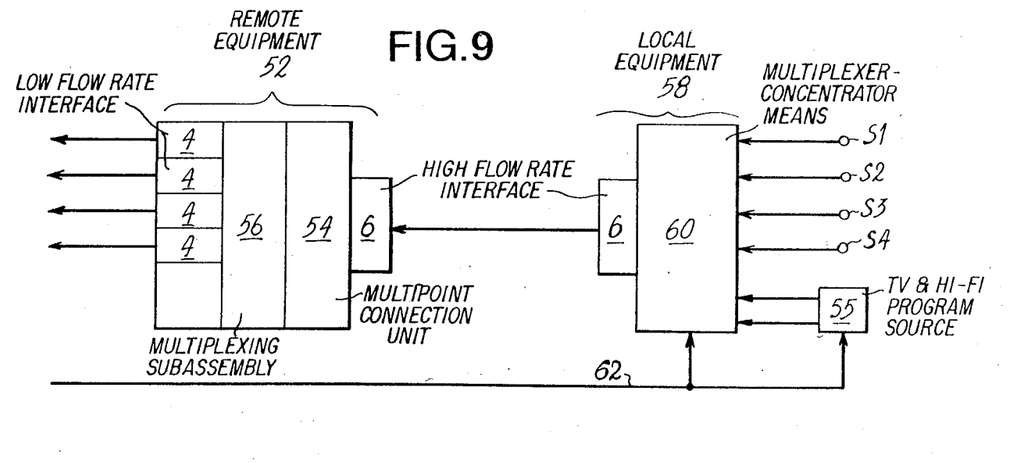
FIG. 9 an example of an application of a multiplexer and a demultiplexer according to the invention in the field of video communications.

FIG. 9 shows an application of the reconfigurable frame multiplexer-demultiplexer to the distribution of television channels and high fidelity sound coded in a digital manner. In this example, the link is unidirectional. Certain television or high fidelity sound channels S$_1$ . . . S$_4$ are multiplexed permanently, so as to be switched in the remote equipment 52 towards the caller subscriber or subscribers. This remote equipment more particularly comprise a multiplexing subassembly 54 like that of FIG. 6 and a multipoint connection unit 56. Other television and high fidelity sound programmes from means 55 and chosen by certain subscribers can be concentrated in the high flow rate frame by means 60 in accordance with the multiplexer-concentrator of FIG. 3, followed by switching into the remote equipment 52. The flow rates present can reach one gigabit/second.

In the present case, the local equipment 58 receives an external control 62 resulting from communications between the different subscribers. The local equipment 58 transmits to the remote equipment 52 the characteristics of the adopted frame structure, as well as the switching instructions to be performed, with the aid of service data blocks inserted in the high flow rate frame.

What is claimed is:

1. A reconfigurable frame multiplexer for processing frame signals and incorporating a frame locking word, data blocks and a service block comprising:
    a synchronous multiplexer receiving on N inputs a number N of low flow rate channels with random flow rates and supplies a multiplexed signal on an output channel,
    a frame locking word insertion means located downstream of the synchronous multiplexer,
    a time base supplying clock and synchronization signals to the synchronous multiplexer and to the frame locking word insert means,
    a monitoring means for monitoring the state of the low flow rate channels and the state of the reconfigurable frame multiplexer,
    transmission management means applying a signal to an input of said synchronous multiplexer, said signal occupying the service block in the frame,
    a microprocessor provided with a random access memory and a read-only memory connected to the monitoring means, to the frame locking word insertion means, to the time base and to the transmission management means,
    a user interface connected to the microprocessor, the improvement being in that the time base comprises the combination of:
    a fast time base,
    two storage means, each one being able to store a frame configuration with data sent by the microprocessor, one of these storage means containing the present frame configuration, i.e. the one which is used at current time, said storage means being addressed in read-mode by the fast time base, the other storage means being addressed in write-mode by microprocessor to store a new frame configuration,
    a switch with two inputs and two outputs, the microprocessor being connected to one input of said switch, the fast time base to the other input of said switch, each address port of the storage means being connected to one output of said switch, said switch also having a control input controlled by the microprocessor for switching its outputs,
    processing means for processing the clock and synchronization signals, said processing means receiving at its input the content of the storage means read by the fast time base.

2. A multiplexer according to claim 1, wherein each storage means is a random access memory.

3. A multiplexer according to claim 1, wherein the two storage means are identical.

4. A multiplexer according to claim 1, wherein the clock and sync signal processing means comprise a decoder receiving at its input the words stored in the storage means read by the fast time base.

5. A reconfigurable frame demultiplexer, receiving frame signals incorporating a frame locking word, data blocks and a service block, said demultiplexer comprising:
    a synchronous demultiplexer receiving at its inputs a frame multiplexer signal and supplying at its output N component signals and an auxiliary signal,
    frame locking word detection means,
    a time base supplying clock and synchronization signals to the synchronous demultiplexer and to the frame locking word detection means,
    a time base supplying clock and synchronization signals to the synchronous demultiplexer and to the frame locking word detection means,
    a transmission management means, receiving at its input the synchronous demultiplexer auxiliary signal,
    a microprocessor provided with a random access memory and a read-only memory connected to the frame locking word detection means, to the time base and to the transmission management means,
    a user interface connected to the microprocessor, the improvement being in that the time base comprises in combination:
    a fast time base,
    two storage means, each one being able to store a frame configuration with data sent by the microprocessor, one of these storage means containing the present frame configuration, i.e. the one which is used at current time, said storage means being addressed in read-mode by the fast time base, the other storage means being addressed in write-mode by microprocessor to store a new frame configuration,
    a switch with two inputs and two outputs, the microprocessor being connected to one input of said switch, the fast time base to the other input of said switch, each address port of the storage means being connected to one output of said switch, said switch also having a control input controlled by the microprocessor for switching its outputs,
    processing means for processing clock and synchronization signals, said processing means receiving at its input the content of the storage means read by the fast time base.

6. A demultiplexer according to claim 5, wherein each storage means is a random access memory.

7. A demultiplexer according to claim 5, wherein the two storage means are identical.

8. A demultiplexer according to claim 5, wherein the timing and sync signal processing means comprises a decoder receiving at its input the words stored in the storage means read by the fast time base.

9. A reconfigurable frame multiplexing-demultiplexing system for sending and receiving frame signals, each frame comprising a frame locking word, data blocks and a service block, said system comprising:
    (A) a multiplexing means comprising:
        a synchronous multiplexer receiving on N inputs a number N of low flow rate channels with random flow rates and supplies a multiplexed signal on an output channel, a frame locking word insertion means, located downstream of the synchronous multiplexer, a time base supplying clock and synchronization signals to the synchronous multiplexer and to the insertion frame locking word means, a monitoring means for monitoring the state of the low flow ratew channels and the state of the multiplexing means, a transmission management means applying a signal to a input of said synchronous multiplexer, said signal occupying the service block in the frame, (B) a demultiplexing means comprising:

a synchronous demultiplexer receiving at its input frame a multiplexed signal and supplying at its output N component signals and an auxiliary signal, frame locking word, detection means, a time base supplying clock and synchronization signals to the synchronous demultiplexer and to the frame locking word, detection means, transmission management means, receiving at its input the synchronous demultiplexer auxiliary signal, (C) a microprocessor provided with a random access memory and a read-only memory connected to the monitoring means, the frame locking word insertion means, the time base and the transmission management mens, of the multiplexing means, to the frame locking word detection means, the time base means and the transmission management means of the demultiplexing means, (D) a user interface connected to the microprocessor, the improvement being in that each time base comprises, in combination:

a fast time base, a switch with two inputs and two outputs, the microprocessor being connected to one input of said switch, the fast time base to the other input of said switch, each address port of the storage means being connected to one output of said switch, said switch also having a control input controlled by the microprocessor in order to switch the outputs, two storage means, each one being able to store a frame configuration with data sent by the microprocessor, one of these storage means containing the present frame configuration, i.e. the one which is used at current time, said storage means being addressed in read-mode by the fast time base, the other storage means being addressed in write-mode by microprocessor to store a new frame configuration, means for processing clock and synchronization signals, said processing means receiving t its input the content of the storage means read by the fast time base.

10. A multiplexing-demultiplexing system according to claim 9, wherein each storage means is a random access memory.

11. A multiplexing-demultiplexing system according to claim 10, wherein the two storage means are identical.

12. A multiplexing-demultiplexing system according to claim 10, wherein each clock and sync signal processing means comprises a decoder receiving at its input the words stored in the storage means read by the fast time base.

* * * * *